United States Patent Office 3,319,356
Patented May 16, 1967

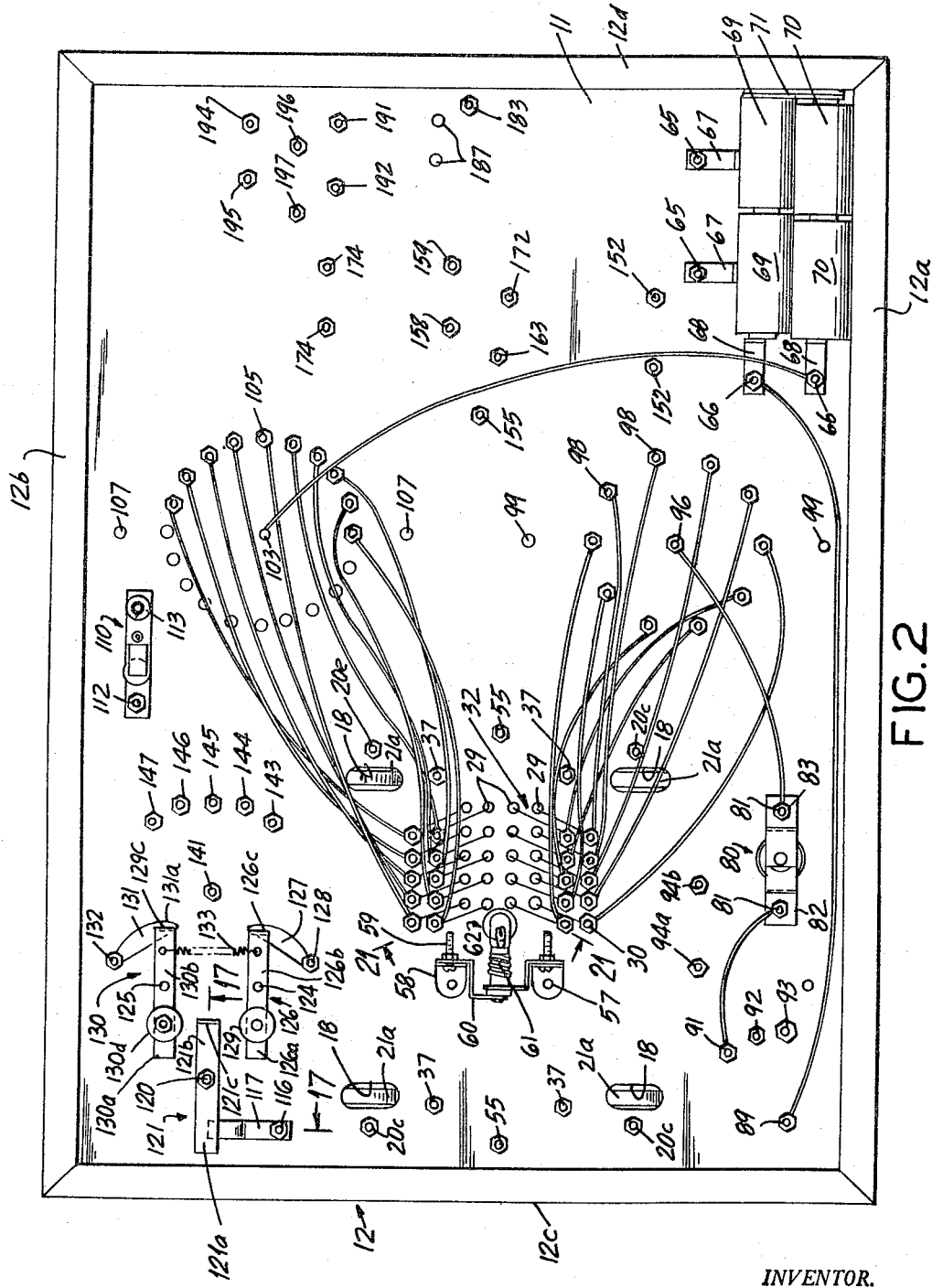

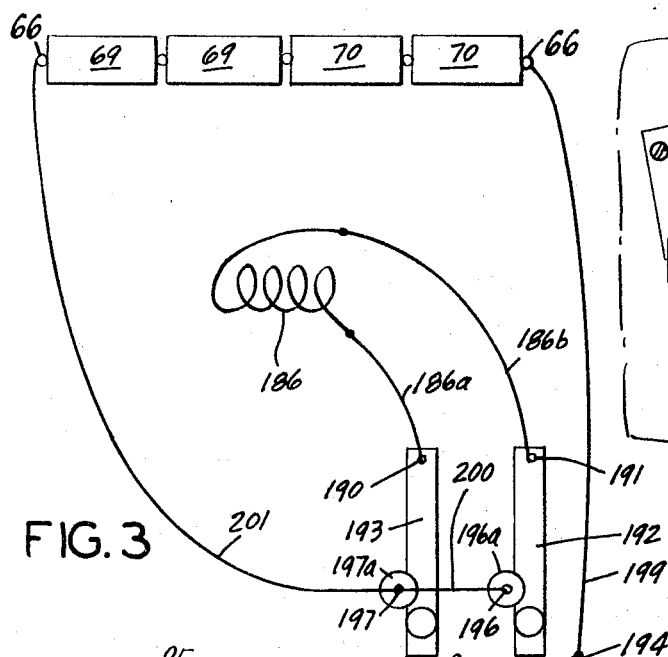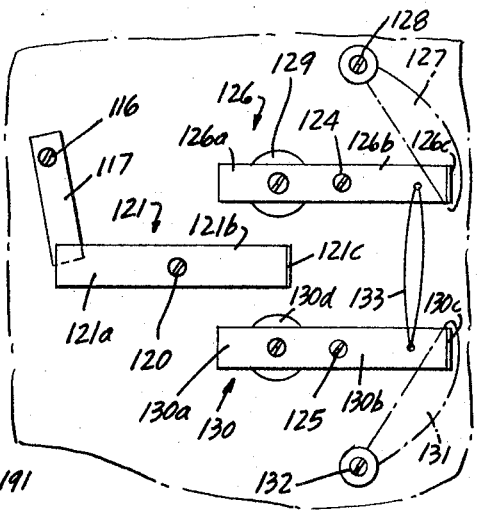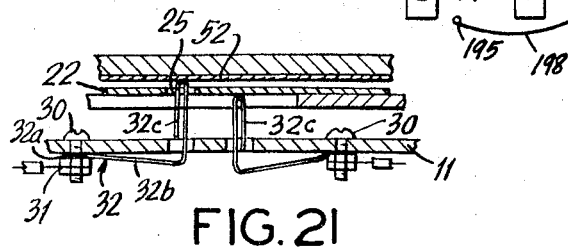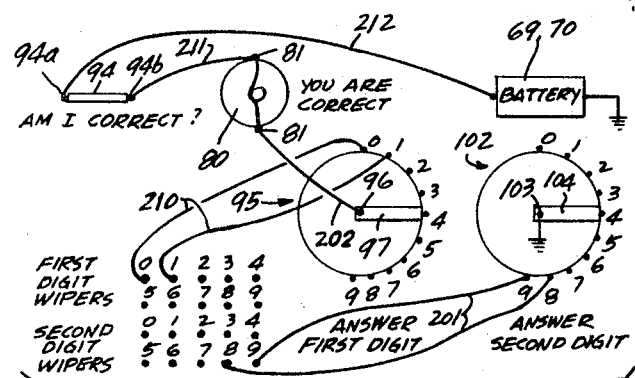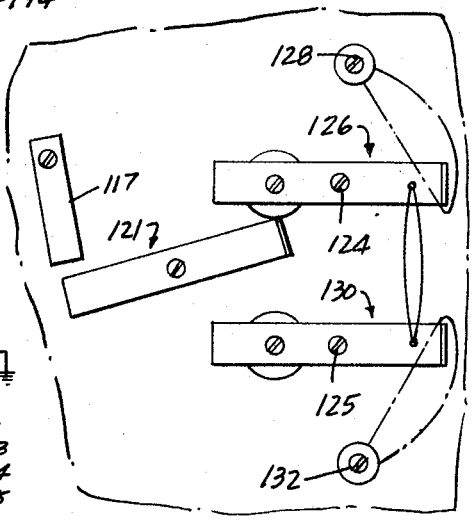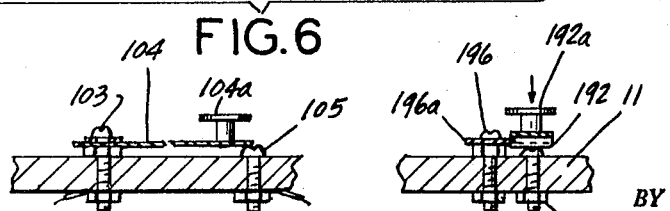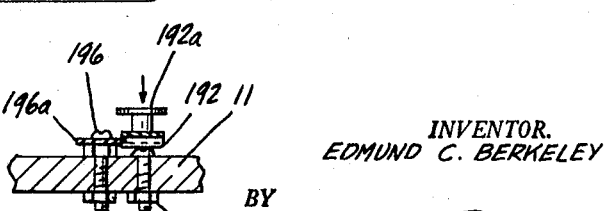

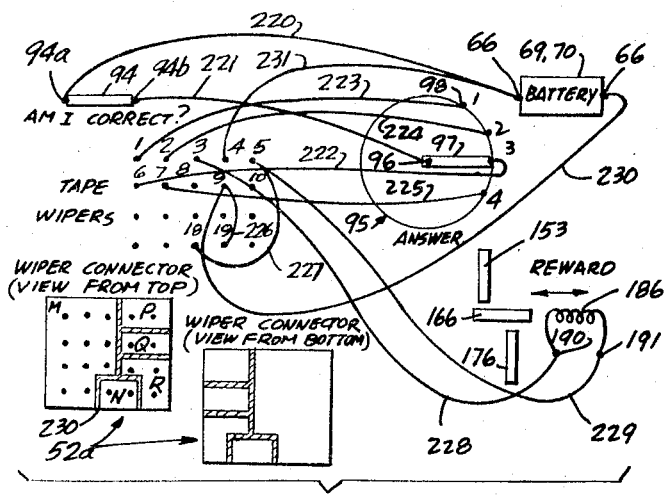
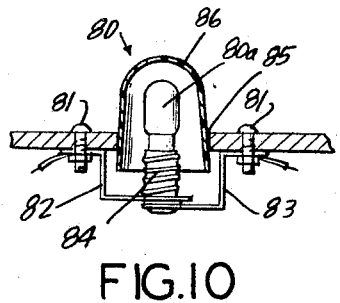
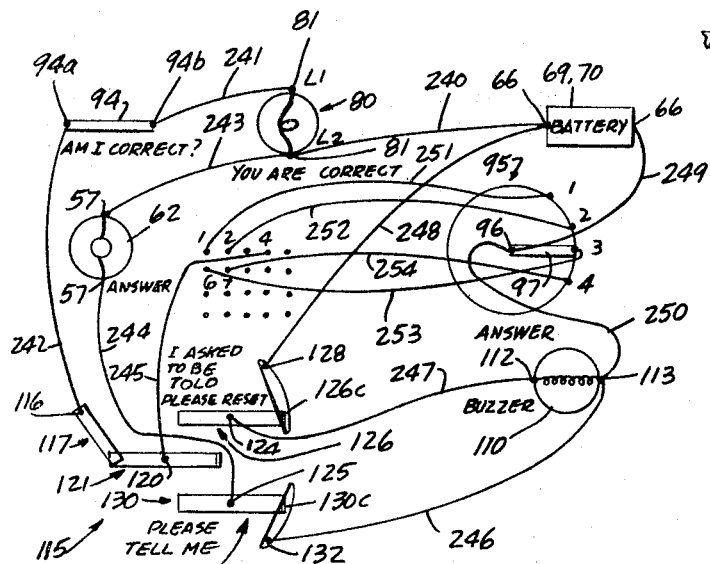
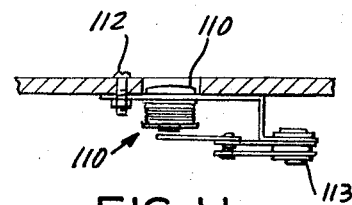
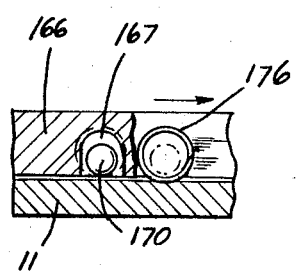
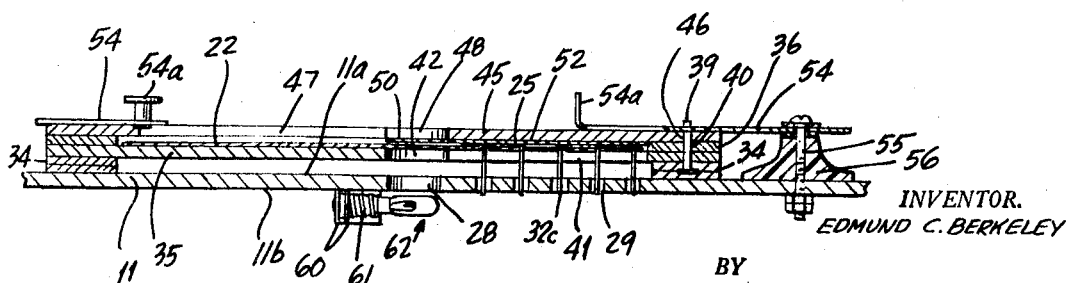

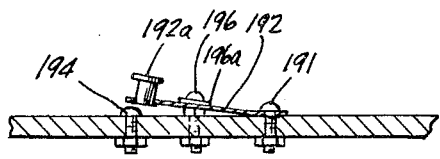
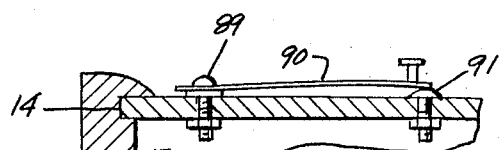
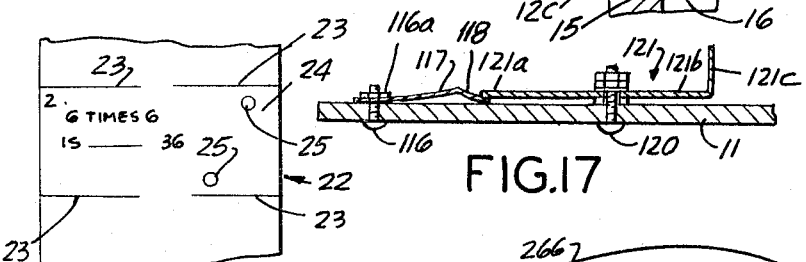
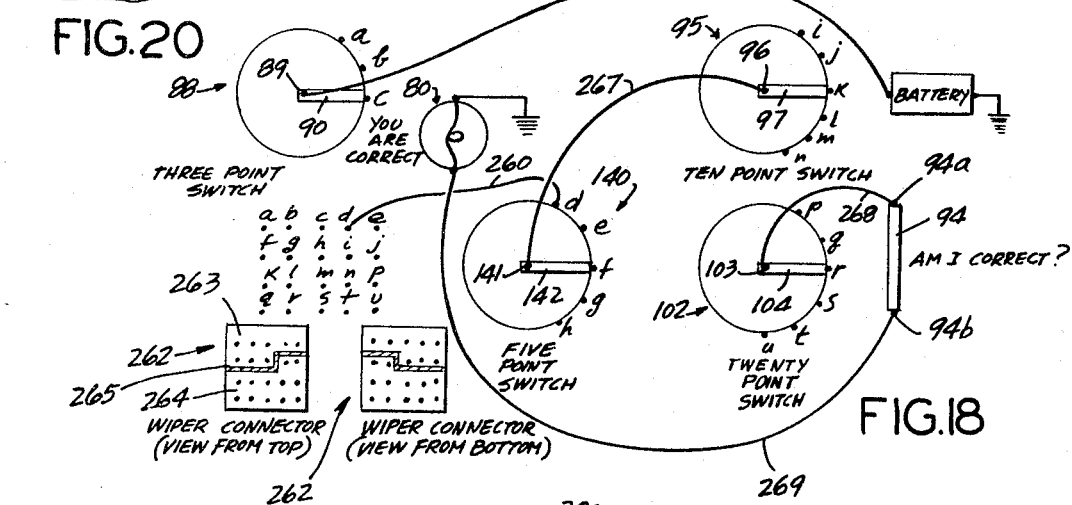
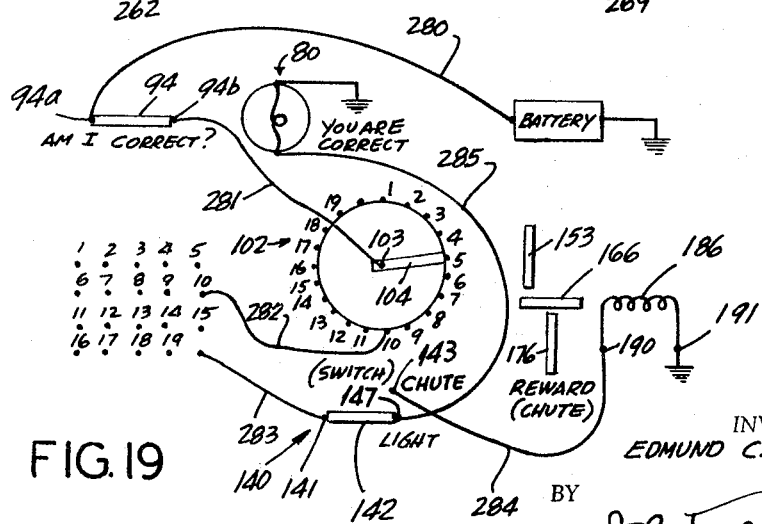

3,319,356
TEACHING OR PROGRAMMED LEARNING MACHINES AND AUTOMATIC TEACHING COMPUTERS
Edmund C. Berkeley, c/o Berkeley Enterprises, Inc., 815 Washington St., Newtonville, Mass. 02160
Filed Nov. 25, 1964, Ser. No. 413,831
22 Claims. (Cl. 35—9)

This invention relates to teaching or programmed learning machines and to automatic teaching computers.

An object of this invention is to provide in a teaching machine of the character described, a punched paper tape and means to read the punched holes of the tape to control a variety of things that may happen, such as lighting a lamp, buzzing a buzzer, or operating a chute.

Another object of this invention is to provide a teaching device of the character described controlled by choosing any one position of a multi-point switch or choosing any one of a pair of points, one of which is chosen from one multi-point switch and the other of which is chosen from another multi-point switch, or by choosing other combinations on a plurality of multiple point switches, to cause actuation of an electrically operated device.

Yet another object of this invention is to provide, in a teaching device of the character described a highly improved tape feed, and highly improved spring wipers for reading the holes punched in the tape.

A further object of this invention is to provide in a device of the character described, a conductor surface to be contacted by the spring wipers with said surface being divided into a plurality of defined areas by insulation between such areas.

A still further object of this invention is to provide in a teaching device of the character described, a "flip-flop" switch comprising a pair of resilient means controlled by manually operated switch arms, the arrangement being such that when one arm of said pair of arms is moved, a third switch arm is moved thereby into engagement with a fixed contact, and upon release of the moved switch arm, it is returned by said resilient means to normal and the third switch arm remains in engagement with the contact and when the other of said pair of switch arms is thereafter moved, it moves the third switch arm of engagement with said fixed contact, and upon release of said other of said pair of switch arms it is returned by said resilient means to its normal position, additional contacts being further provided to be momentarily individually engaged upon movement of said pair of switch arms away from normal.

Yet a further object of this invention is to provide in a teaching device of the character described, electromagnetic means to cause a chute latch to open by magnetic attraction, to transport an article from the chute to a second chute, and to close said latch by magnetic repulsion, and means to cause magnetic attraction or repulsion of said electro-magnetic means.

A still further object of the invention is to provide a teaching machine of the character described, in the form of a kit, the parts of which are easy to assemble by even young people, and with which many different arrangements, combinations or variations can be readily made to solve different problems.

Yet a further object of this invention is to provide a strong, rugged and durable teaching machine of the character described, which shall be relatively inexpensive to manufacture, easy to assemble and manipulate, which shall be instructive and amusing to use, and which shall yet be practical and efficient to a high degree.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown an illustrative embodiment of this invention, FIG. 1 is a top plan view of a device embodying the invention;

FIG. 2 is a rear view thereof with the lower end swung upward 180°;

FIG. 3 is a diagrammatic view illustrating the circuit for testing the electro-magnet control for the chute mechanism;

FIG. 4 is a diagrammatic view illustrating the "flip-flop" switch with the switch in normal open position;

FIG. 5 is a view similar to FIG. 4, but showing the switch in closed position;

FIG. 6 is a diagrammatic view illustrating one set-up of the teaching machine using two ten point switches;

FIG. 7 is a diagrammatic view showing a set-up of the teaching machine illustrating the use of a conductor for the spring wipers, divided into several areas each insulated from the others;

FIG. 8 is a diagrammatic view illustrating the use of the "flip-flop" switch;

FIG. 9 is an enlarged cross-sectional view taken on line 9—9 of FIG. 1;

FIG. 10 is a cross-sectional view taken on line 10—10 of FIG. 1;

FIG. 11 is a cross-sectional view taken on line 11—11 of FIG. 1;

FIG. 12 is a cross-sectional view taken on line 12—12 of FIG. 1;

FIG. 13 is a cross-sectional view taken on line 13—13 of FIG. 1;

FIG. 14 is a cross-sectional view taken on line 14—14 of FIG. 1;

FIG. 15 is a cross-sectional view taken on line 15—15 of FIG. 1;

FIG. 16 is a cross-sectional view taken on line 16—16 of FIG. 1;

FIG. 17 is a cross-sectional view taken on line 17—17 of FIG. 2;

FIG. 18 is a diagrammatic view of a set-up of the teaching machine illustrating the use of four multi-point switches;

FIG. 19 is a diagrammatic view illustrating the use of the switch which can move from one position to actuate a light to another position to actuate the electro-magnet which controls the reward chute;

FIG. 20 is a top view of a piece of the punched tape; and

FIG. 21 is a cross-sectional view on line 21—21 of FIG. 2, illustrating the wiper connections.

Figure 1:
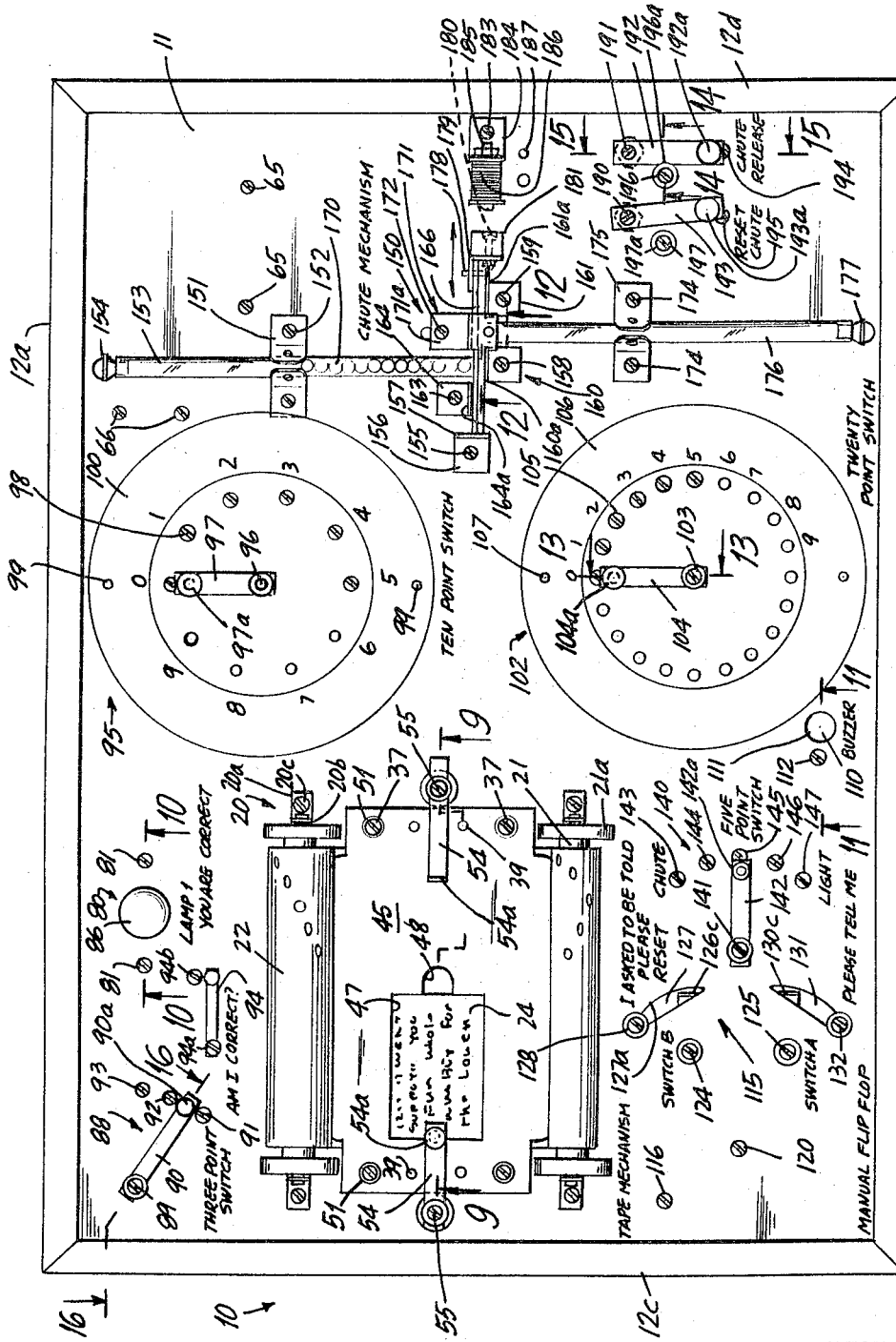

Referring now in detail to the drawing 10, designates a teaching machine embodying the invention. The same comprises a base or board 11 of electricity insulating material having a front surface 11a and a rear surface 11b. Said board may be of rectangular shape and may be provided with a reinforcing frame 12 having a top portion 12a a bottom portion 12b and end portions 12c, 12d. Each of said portions of said frame has, an inside front groove 14 to receive an outer edge portion of board 11, and an inside rear grove 15 receiving an outer edge of a rear cover board 16, thereby forming a compartment 17 between said boards.

Said front board 11 is formed with two vertically aligned spaced pairs of slots 18 (locking at FIG. 2) adjacent the left side of the board. Attached to the front of the board adjacent said slots 18, are pairs of symmetrical angle brackets 20, each having a foot 20a contacting said board and from which extends upwardly an apertured ear 20b. Feet 20a are fastened to the board 11 by screws 20c. Journalled in each pair of said apertured ears 20b is a spindle or roller 21 provided at the ends thereof with hand wheels 21a projecting into slots 18. A paper or other flexible sheet, web or tape 22 has its end edges attached to the spindles. The end portions of the tape are rolled on said spindles with the portion between the rolled ends spaced from and parallel to said board.

The tape 22 (FIG. 20) is divided by lines 23 into longitudinal frames or sections 24 extending across the tape. Each frame 24 has at its left side a printed and numbered problem, with a line or dash in the answer indicating a number to be supplied by the player or operator, as an answer to the problem. The answer is printed in the middle of frame 24 (the answer is "36" in the frame shown in FIG. 20). The right side of each frame or section 24 has punched holes 25, which will cooperate with other elements of the device to cause an electrically operable device to operate upon the user correctly setting some switch or switches on the machine corresponding to the correct answer to the problem, as will be explained hereinafter.

The board 11 has a hole 28 centrally located between the four slots 18 so that the printed answer in each section 24 ("36" in FIG. 20) will overlie said hole when said section is centered between the spindles and the punched holes 25 are in proper position, as will be explained hereinafter.

Said board 11 is formed with two pairs of parallel rows of small holes 29, there being five holes in each row, making twenty such holes. These holes are located in a square area to right of hole 28 with two rows above and two rows below. In spaced relation to each of the two pairs of rows of holes 29, are two pairs of rows of bolts 30 passing through suitable openings in the panel board 11. The heads of the screws are at the front surface of the board, on each bolt are a pair of nuts 31 serving to attach wipers 32 to said bolts. There is one wiper for each hole. Each wiper is a conducting wire and has a loop 32a through which the screw shank of the bolt passes, an arm 32b extending therefrom below the panel board and terminating in an upwardly extending bent back spring wiping portion 32c projecting up through a hole 29 and through a hole 25 in tape 22, if it is aligned with a punched hole, and if not, then contacting the underside of the tape. The punched holes 25 may be in any of twenty positions in each frame to overlie any of the twenty holes 29 and hence the twenty wiper ends 32c.

At opposite sides of the area between the spindles 21 are spacer strips 34 (FIG. 9) on which is mounted a lower stiff board or plate 35, on which are mounted a pair of opposite side spacer strips 36. Plate 35 and spacer strips 34, 36 are fixed to the base panel 11 by bolts 37. The ends of plate 35 and spacer strips 34, 36 are located between the brackets 20.

Pins 39 attached to the spacer strips project up above the spacer strips 36 and pass through locating holes 40 in plate 35.

Plate 35 has a rectangular window opening 41 through which all twenty wiper portions 32c project. Extending from opening 41 is a cut out or notch 42 disposed above hole 28.

The tape 22 overlies the bottom plate 35 and covers the notch 42 and rectangular window opening 41 so that wiper ends 32c aligned with any punched holes will pass through such holes. The punched holes in the tape will be confined to areas overlying opening 41.

Removably mounted on top of plate 35 is an upper plate 45 having locating openings 46 to receive the upper ends of the locating pins 39. Plate 45 has a rectangular window opening 47 overlying the left side of each frame section 24 of the tape, and with a cut-out or notch 48 overlying the notch 42 and hole 28. Notch 48 is covered by a red or translucent, preferably colored, piece 50 of film which covers the answer printed in the center of section 24 of the tape, so that the answer cannot be read unless the film is illuminated, as will be explained hereinafter. Plate 45 also has holes 51 registering with and receiving the heads of screws 37.

The underside of plate 45 in an area corresponding to overlying opening 41 in plate 35, is covered by an aluminum foil sheet or other conductor 52. This conductor is engaged by the upper ends of wiper portions 32c which project through punched holes, so that all wipers are located at punched holes are interconnected electrically.

However, the foil sheet 52 can be divided into a plurality of conductive areas by insulating strips adhered to the underside of said sheet, as illustrated in FIG. 7, so that only wipers aligned with punched holes over any one conductive area, are electrically connected, as will be explained hereinafter.

Means is provided to releasably clamp or hold down plate 45 on plate 35. To this end, clamp arms 54 are pivoted to pivot bolts or pins 55 attached to panel board 11, as shown in FIG. 9. Clamp arms 54 have upstanding handle knobs 54a. Spacers 56 formed with holes to receive the shanks of said bolts 55, keep said clamps at the level of the top surface of plate 45. By swinging the clamps about bolts 55, they will contact the top surfaces of plate 45 to hold it down, or release said plate, depending on the angular positions of said clamps.

Attached to the rear of panel board 11 by bolts 57, are a pair of brackets 58 to which are bolted, as by bolts 59, a pair of members 60 supporting a lamp socket 61. Members 60 are electrically connected to the shell and center contact, respectively, of the lamp base. A lamp 62, here designated as the "answer lamp" is screwed into the lamp base, with the bulb of the lamp below opening 28.

When the lamp 62 is not illuminated, the player cannot see the correct answer printed on tape 22 through the red film 50. However, when the lamp is energized and illuminated, it will show up the correct answer through the film 50, so that it can be readily seen. For frame or section 24 on tape 22 shown in FIG. 20, the correct answer that will be seen is "36." The means for energization of lamp 62 will be explained hereinafter.

Means is provided to supply electricity to lamp 62 and to other electrical devices mounted on the board 11 and to be described hereinafter. To this end, there is attached to the rear surface of panel board 11, by means of two horizontally aligned bolts 65, and two vertically aligned bolts 66, two pairs of angle-shaped brackets 67, 68, respectively, having means for supporting two pairs of dry batteries 69, 70. The central contact of one battery 69 is connected to the casing of one battery 70 by a conductor 71 so that the batteries are connected in series circuit, with the central contact of one end battery engaging one bracket 68, and the casing of the other end battery engaging the other bracket 68 (FIG. 2). The arms of the brackets 67, 68 are so bent as to hold the batteries to the back of board 11. The conductor 71 is clamped between the adjacent batteries and the inside of frame wall 12d.

Another lamp 80 herein designated as the "You Are Correct" lamp, is provided, and as will appear hereinafter, it may be illuminated when the operator sets the machine at the correct answer. To this end, a pair of bolts 81 (FIGS. 1 and 10), pass through the panel board 11. Said bolts 81 attach to said board 11, a pair of brackets 82, 83 supporting a lamp socket (screw type) 84. One bracket engages the center contact and the other the shell. Socket 84 is at right angles to board 11, and is centered with an opening 85 in the board. A lamp bulb 80a is screwed to shell 84. A hood or globe 86 projecting into opening 85, surrounds the bulb.

In the upper left hand corner of the board 11 is a switch 88 designated as a "Three Point Switch." Said switch 88 comprises a bolt 89. Pivoted to bolt 89 and located at the front surface of board 11 is a switch arm 90, rotatable into selective engagement with the heads of three spaced bolts 91, 92, 93 arranged in an arc. Switch arm 90 may have a knob 90a at its free end. Switch arm 94 pivoted to bolt 94a engages the head of a bolt 94b when its free end is depressed. This switch is designated as the "Am I Correct?" switch. The use of these switches will be explained hereinafter.

The panel board 11 is also provided with a "Ten Point" switch 95. To this end a central bolt 96 passes through said board. Pivoted thereto is a switch arm 97 located at the front of the board 11 and provided with a knob 97a. The board 11 is formed with ten holes arranged in a circle about the center bolt, and passing through each hole is a bolt 98. The heads of the bolts are at the front of the board. Lock nuts are screwed to the screw shanks of said bolts. (This is true also of bolts 65, 66, 81, 89, 91, 92, 93.) As arm 97 is rotated it will selectively contact heads of bolts 98. Attached to board 11 are a pair of pins 99 passing through diametric holes in a ring 100 of paper marked with numeral 0 to 9 adjacent the ten bolts 98, respectively.

On said board is a "Twenty Point Switch" 102. The same comprises a center bolt 103 to which is pivoted a switch arm 104. The switch 102 further comprises twenty bolts 105 arranged in a circle around the center bolt 103. As arm 104 is rotated, its outer end will selectively contact heads of bolts 105. Fixed to board 11 is a ring 106 of paper surrounding the circle of bolts 105, and held in place by means of a pair of diametric locating pins 107 passing through holes in the ring. The ring is marked with the numerals 1 to 20 adjacent the twenty bolts 105, respectively. The heads of bolts 103, 105 are at the front face of board 11. Switch arm 104 has a knob 104a at its free end.

An electrically operated buzzer 110 of any suitable type, is attached to the back of board 11 adjacent an opening 111, by means of a bolt 112. The bolt 112 acts as one binding post for the buzzer which has a second binding post or terminal 113.

The "Twenty Point Switch" 102 may be located on the board 11 below the "Ten Point Switch" 95, and both are located to the right of the tape, looking at the front of panel board 11 (FIG. 1).

At the lower left side of the board 11, looking at the front thereof, and below the tape 22, is a "MANUAL FLIP FLOP" switch 115. The same comprises a bolt 116 passing through the board, with the head thereof at the front face of board 11 and with its shank passing through a hole in the board and carrying a nut 116a. Attached to said shank (see FIGS. 2 and 17) by nut 116a is a switch arm 117 having an outer tongue 118 close to the rear of the panel board.

In spaced relation (below and to the right) to bolt 116, is a bolt 120 passing through the panel board and pivoted thereto is a switch lever 121 located at the rear of the board. Lever 121 has an arm 121a adapted to contact switch arm 117 in one position of said lever, and a second arm 121b provided with a rearwardly extending finger 121c. As shown in FIG. 2, lever 121 is in engagement with switch arm 117.

On the panel board and passing therethrough, are a pair of vertically aligned bolts 125, 124 the former marked "Switch A" and the latter marked "Switch B." Said bolts 124, 125 are to the right of and symmetrically disposed above and below bolt 120 (looking at FIG. 1). Pivoted to bolt 124, at the rear of board 11, is a lever 126 having one arm 126a and an opposite arm 126b. Arm 126b has at its outer end, a foot 126c projecting through an opening 127 in board 11. Opening 127 is inclined downwardly to the right and has an arcuate outer edge 127a. When lever 124 is in horizontal position, foot 126c projects through the lower end of opening 127. Attached to said board, at the upper end of opening 127, is a bolt 128. On arm 126a of lever 126 is an insulated disc or button 129.

Pivoted to bolt 125, and located at the rear of board 11, is a lever 130 similar to lever 126. Lever 130 has an arm 130a carrying an insulating disc or button 130d, a second arm 130b having a foot 130c passing through an opening 131 in board 11. Opening 131 is symmetrical to opening 127 and slants upwardly and to the right and has an outer arcuate edge 131a. Attached to said board 11 and passing through the lower end of opening 131 is a bolt 132. Arms 126b, 130b are interconnected by a tension spring or rubber band 133 which manually tends to rotate arms 126b, 130b of switch levers 126, 130 inwardly in opposite direction, toward each other to bring feet 126c, 130c to the inner ends of slots or openings 127, 131.

When switch lever 121 is in horizontal position, and engages switch arm 117, levers 126, 130 are in normal horizontal position and are spaced from said switch lever 121.

However, should the operator grasp foot 130c and move it down (looking from the front) then disc or button 130d will contact foot 121c of lever 121 and rotate it to disengage said lever from switch arm 117, as shown in FIG. 5. At the same time, foot 130c will contact bolt 132 momentarily. When the operator releases lever 130, spring 133 will move lever 130 back to normal position, but lever 121 will remain out of contact with switch arm 117. Also, upon release of lever 130, its contact with bolt 132 will be broken.

If thereafter foot 126c is grasped and lever 126 swung, the button 129 will push lever 121 back to horizontal position and into engagement with switch arm 117. Also foot 126c will contact bolt 128 momentarily until said lever 126 is released and moved back to horizontal position by spring 133.

On board 11 and adjacent bolt 128 (at the front of the board) may be marked the legend "I Asked To Be Told" and "Please Reset." Adjacent bolt 132 is marked the legend "Please Tell Me."

Adjacent the "Flip Flop Switch" 115 is a "Five Point Switch" 140, so marked on the front of the board. Said switch 140 comprises a bolt 141 passing through the board 11, with the head of the bolt at the front face of the board. Pivoted to bolt 141, and located at the front face of the board, is a switch arm 142 provided at its outer end with a knob 142a. Also passing through suitable openings in the board are five bolts 143, 144, 145, 146, 147, respectively, arranged in an arc. The heads of said bolts are at the front of the panel board. The outer free end of switch arm 142 may selectively contact said bolts 143–147 one at a time as said switch arm is rotated, or swung about bolt 141. Near the bolt 143 is marked the legend, "CHUTE," and near the bolt 147 is marked the legend, "LIGHT," for the purpose hereinafter appearing.

The panel board 11 may have mounted thereon a chute mechanism 150 located at the right of switches 95, 102 (at the right end of the panel board looking at FIG. 1). Chute mechanism 150 comprises a pair of spaced, symmetrical brackets 151 attached to the panel board by bolts 152 and extending through said board. Said brackets 151 have upwardly and inwardly inclined tongues engaging a transparent tube 153, the upper end of which may be closed by a removable stopper 154. Tube 153 is parallel to end portion 12d of the frame 12. The lower end of tube 153 is open.

Attached to the front of the panel board 11 by bolt 155 is an angle bracket 156 having a flange 157 projecting away from the front face of the board in a plane parallel to frame end 12d, and located at the lower end of tube 153. Attached to the panel board by bolts 158, 159 are angle brackets 160, 161, respectively, having coplanar flanges 160a, 161a, parallel to frame portion 12a and disposed below the level of the lower end of tube 153. Flange 160a is disposed directly below the lower end of tube 153 in spaced relation thereto. Attached to said board 11, by bolt 163, is an angle bracket 164 having a flange 164a disposed in a plane parallel to the planes of flanges 160a, 161a and located at the level of the lower end of tube 153 and to the left side of said tube (looking at FIG. 1).

Slidably mounted between flange 164a and flanges 160a, 161a is a latch strip 166 (which may be laminated) of cardboard or other suitable material. In one position thereof, illustrated in FIG. 1, the left end of strip 166 contacts flange 157. Said strip is formed with a through opening or notch 167 registering with the lower open end of tube 153. Little steel balls 170 are in tube 153. The lowermost ball 170 will drop into notch 167 to contact the top of flange 160a when the chute is in the position of FIG. 1. A Z-shaped bracket 171 is attached to panel 11 by a bolt 172 passing through a foot 171a of said bracket. Bracket 171 has an intermediate wall 171b contacting the top of strip 166 and extending therefrom as a flange 171c parallel to board 11 and contacting an outer edge of strip 166.

Attached to board 11 by a pair of bolts 174 are a pair of brackets 175 similar to brackets 151 and holding against the front surface of board 11, a receiver tube 176 disposed parallel to, but offset from tube 153. The lower open end of tube 176 is closed by a stopper 177. The upper end of tube 176 is against the underside of latch strip 166 and right next to flange 160a, and between flanges 160a, 161a. Fixed to the right end of strip 166, as by bolt 178 is an angular bracket 179 to which is attached, as by bolt 180, a permanent ceramic magnet 181.

Attached to the panel board 11 at the right side thereof (FIG. 1), as by bolt 183, is an angle bracket 184, to which is attached, as by bolt 185, an electro-magnet 186. The panel board 11 is formed with a pair of holes 187 below the electro-magnet 186 through which the terminal ends of the coil of said electro-magnet passes. If current passes through the electro-magnet in one direction, the magnet 181 is attracted to the electro-magnet 186, thereby pulling the latch or strip 166 to the right, so that the steel ball in notch 167 is moved to the right, and is transferred to the upper open end of tube 176 and hence it drops down into said tube. When current passes through said electro-magnet in an opposite direction, the magnet 181 is repulsed or repelled, to move the strip 166 to the left to realign notch 167 with the lower end of tube 153 and to cover the upper open end of tube 176, so that another steel ball will drop down into notch 167 and onto flange 160a. The thickness from top to bottom of strip 166 is equal to or slightly larger than the diameter of a ball 170 so that only one ball at a time can be in notch 167.

Switch test means is provided to energize electromagnet 186 and to reverse direction of current flowing therethrough.

To this end, a pair of bolts 190, 191 are attached to said board 11 at the right side thereof and below the electro-magnet 186, looking at FIG. 1. One lead 186a (FIG. 3), for the coil of electro-magnet 186 is attached to bolt 190. The other lead 186b is connected to bolt 191. Pivoted to bolt 191 is a switch arm 192 extending downwardly and located at the front of panel board 11. A similar switch arm 193 is pivoted to bolt 190. Switch arms 192, 193 are provided with knobs 192a, 193a at their lower free ends.

Attached to board 11 are a pair of bolts 194, 195, passing through the board and having heads at the front of said board. The outer end of switch arm 192 is bent away from the board 11. A bolt 196 passing through the panel board 11 carries a washer 196a spaced from the board. When switch arm 192 is swung in a clockwise direction, looking at FIG. 1, a side edge thereof may be engaged beneath washer or collar 196a to electrically engage bolt 196, but the free end of said switch arm will not be in engagement with the head of bolt 194 until it is pressed down.

The panel board is marked with the legend "Chute Release" at its front face, just below bolt 194.

Switch arm 193 can similarly engage beneath a collar 197a to electrically engage bolt 197 passing through the board 11, but the free end of said switch arm is not in engagement with the head of bolt 195 until it is pressed down.

To test the operability of the chute mechanism, bolts 194, 195 may be interconnected by a wire 198 at the back of board 11. It will be understood that bolts 190, 191, 194, 195, 196 and 197 act or serve as binding posts for attachment of wires thereto by means of nuts screwed to screw shanks of said bolts.

Bolt 194 is connected by wire 199 to one bolt 66.

Bolts 196, 197 are interconnected by wire 200. Bolt 197 is connected by wire 201 to the other bolt 66.

When the free end of switch arm 192 is depressed, it contacts the head of bolt 194 and disengages electrically from washer 196a and bolt 196. When switch arm 193 is depressed it engages bolt 195 and electrically disengages bolt 197. Thus when switch 192 is depressed, electricity from the batteries passes through the coil of the electromagnet in one direction to move the latch strip 166 to the right to transfer a steel ball from one tube 153 to the other tube 176. Upon release of switch arm 192 and depression of the free end of switch arm 193, the current will pass through the coil 186 in opposite direction to move the latch strip 166 to the left to reset the chute mechanism.

Wires may be interconnected between various binding posts to produce different settings for teaching solutions to various problems. Representative set-ups are shown as examples of such set-ups, in FIGS. 6, 7, 8, 18 and 19 utilizing various combinations of the structures described above.

In FIG. 6 is shown a set-up utilizing the "Ten Point Switch" 95 and ten bolts (marked "0–9") of the "Twenty Point Switch" 102. In this illustration, the top two rows of wipers are marked "0–9" and are called the "FIRST DIGIT WIPERS." The lower two rows of wipers are marked "0–9" and called the "SECOND DIGIT WIPERS." Wires 210 are connected from the bolts or bind posts 30 for the top two rows of wipers to the correspondingly numbered bolts or binding posts or bolts 98 of the "Ten Point Switch" 95. Only two of the wires 210 are shown connecting wipers "0" and "1" of "FIRST DIGIT WIPERS" to contacts or binding posts "0" and "1," respectively of switch 95.

Similarly, the binding posts for the wipers of the "SECOND DIGIT WIPERS" are connected by wires 201 to correspondingly numbered binding posts of the switch 102. Only two of such wires are shown in the drawing, the same being wires connecting wipers numbered "8" and "9" with bolts numbered "8" and "9" respectively of switch 102. One binding post 81 of lamp 80 ("YOU ARE CORRECT" lamp) is connected by wire 202 to binding post 96. The other binding post 81 is connected to bolt 94b by wire 211. Bolt 94a to which the AM I CORRECT? switch arm 94 is pivoted, is conected by wire 212 to one end of the series connected batteries 69, 70 and the other end may be grounded. Bolt 103, to which switch arm 104 of switch 102 is pivoted, may be grounded. If desired, bolt 103 may be wired to the opposite end of the series connected batteries.

The placement of the holes on the tape will determine the correct answer, which will correspond to the positions of switch arms 97, 104. Thus if the question on the tape has "44" as its answer (the question might be "How much is 11×4?") then the frame of the tape in reading position would have one hole over the number "4" wiper of the FIRST DIGIT WIPERS and one hole over the number "4" wiper of the SECOND DIGIT WIPERS. Upon placing the arms 97, 104 as shown, the circuit would go from the battery through wire 212, switch arm 94, wire 211, lamp 80, wire 202, arm 97, binding post number "4" of switch 95, wire 210 to binding post for wiper No. "4" of FIRST DIGIT WIPERS, foil conductor 52, wiper No. "4" of SECOND DIGIT WIPERS, binding post for said wiper, wire 201 that connects said binding post to bolt No. 4 of the switch 102, switch arm 104 to bolt or binding post 103. The closing of switch 94 will hence cause the lamp 80 to be illuminated to show that the answer is correct.

Thus one hundred answers from 0 to 99 can be the correct answer by proper punching of holes in one hundred frames of the tape.

FIG. 7 is a diagram illustrating a set-up which will allow choice among any one of four answers, which will give a maximum of one reward per frame, and will reset the chute latch only when the tape rolls forward (tape moves up looking at FIG. 1) from one frame to the next. To accomplish this feat, means is provided to put current through the electro-magnet 186 in one direction to attract the chute latch, and in the other direction to repel the chute latch. As will appear hereinafter, the portion of the tape which causes the resetting of the chute latch is read electrically only when the tape is advanced from one frame or section 24 to the next.

To this end, one end of the battery is connected by wire 220 to bolt 94a. Bolt 94b is connected by wire 221 to bolt 96. Bolt 98 at station "3" of switch 95 is connected by wire 222 to bolt for wiper "6." Bolt 98 at station "1" of switch 95 is connected by wire 223 to the bolt for wiper "1." Bolt 98 of switch 95, at station "2," is connected by wire 224 to the bolt for wiper "2." Bolt 98 of switch 95 at station "4" is connected by wire 225 to the bolt for wiper number "7." Bolts for wipers 9 and 19 are connected by wire 226. Bolts for wipers "5" and "18" are interconnected by wire 227. Bolt for wiper "3" is connected by wire 228 to bolt for wiper "10" and to bolt 190. Bolt for wiper "5" is connected by wire 229 to bolt 191. Bolt for wiper "9" is connected by wire 230 to the other end of the battery. Also, the first terminal of battery 69, 70 is connected to wiper bolt "4" by wire 231.

In the present instance, the face sheet 52 is replaced by a connector 52a shown in FIG. 7, at the left viewed from the top and at the right, viewed from the bottom. The conductor 52a is divided into areas "M," "N," "R," "P" and "Q" insulated from one another by insulator strips 230. Area "M" encompasses wipers 1, 2, 3, 6, 7, 8, 11, 12, 13, 16 and 17. Area "Q" encompasses wiper 9 and 10. Area "N" encompasses wipers 18 and 19. Area "P" encompasses wipers 4 and 5. One area "R" encompassing wipers 14, 15 and 20, may be all insulation.

The tape will have four frames 24. Each frame has holes punched over wiper stations 14, 15, 19, 20. Also they have holes over wipers 18. The four frames will have correct answers of 1, 2, 3 and 4, respectively. They will all have a hole over wiper 3. The frames with correct answers "1," "2," "3" and "4," will have holes over wipers 1, 2, 6 and 7, respectively.

In FIG. 7 the switch arm 97 is at station 3 of switch 95. Assuming that the frame of tape 22 with correct answer "3" is in reading position, electro-magnet 186 will be energized to attract the latch 166 to bring a steel ball from tube 153 to tube 176 to reward the player. The current will go from one terminal 66 of the battery, through wire 220, switch 94 (assuming it is pressed down), wire 221, switch arm 97, wire 222, wiper 6, passing through hole 6, connector "M," wiper 3 (which passes through hole 3), wire 228, terminal 190, electro-magnet 186 (to the right), terminal 191, wire 229, wiper 5, wire 227, wiper 18 (passing through hole 18), connector "N," wiper 19 (passing through hole 19) wire 226 to wiper 9, and through wire 230 to the other side of the battery.

The same applies to the other frames where the correct answers are 1, 2 or 4. As stated above, the frame where the correct answer is "1" has a hole over wiper 1. The frame where the correct answer is "2" has a hole over wiper 2. The frame where the correct answer is "4" has a hole over wiper 7. The switch arm 97 must contact bolt 98 at station "1" on switch 95 for the frame where the correct answer is "1"; at station "2" for the frame where the correct answer is "2"; and at station "4" for the frame where the correct answer is "4." It will be noted that if, before resetting, the switch 94 is pressed down a number of times, nevertheless the chute latch will operate only once, and only one reward is given for one correct answer.

As the tape is moved forwardly from one frame to the next (upwardly looking at FIG. 1) the chute latch will be reset.

Thus, when the tape is moved a distance of two rows of wipers, then holes normally over wipers 14, 15, 19 and 20 will then be over wipers 4, 5, 9 and 10, and the circuit will supply current through the electro-magnet in an opposite direction to reset the chute latch. Thus the current will pass from one terminal of the battery, through wire 231, wiper "4" (which now passes through hole normally over wiper "14), connector "P," wiper 5, (which now passes through a hole which was normally over wiper 15), wire 229, terminal 191, electro-magnet 186 (to the left), terminal 190, wire 228, wiper 10 (which now passes through a hole which was normally over wiper 20), connector "Q," wiper 9 (which now passes through a hole normally over wiper 19), and wire 230 to the other terminal of the battery.

FIG. 8 illustrates a set-up which employs the "Flip Flop Switch" 115, the "ANSWER" lamp 62, and the buzzer 110, as well as the "You Are Correct" lamp 80.

In this set-up, one terminal 66 of the battery is connected by wire 240 to one terminal $L_2$ of the lamp 80. The other terminal $L_1$ of lamp 80 is connected by wire 241 to terminal 94b of the "AM I CORRECT?" switch 94. Terminal 94a is connected by wire 242 to bolt 116 to which switch arm 117 is pivoted. Terminal $L_2$ of lamp 80 is connected by wire 243 to one bolt 57 of lamp 62. The other bolt 57 of said lamp 62 is connected by wire 244 to bolt 125 of the "Flip Flop Switch" 115. Bolt 120 to which switch lever 121 is pivoted, is connected by wire 245 to wiper "4". Bolt 132 is connected by wire 246 to terminal 113 of the buzzer. Terminal 112 of the buzzer is connected by wire 247 to bolt 124 to which lever 126 is pivoted. Bolt 128 is connected by wire 248 to the first-mentioned terminal 66 of the battery. The other terminal 66 of the battery is connected by wire 249 to the center bolt 96 of switch 95. Said center bolt 96 is connected by wire 250 to terminal 113 of the buzzer. The bolt in position 1 of switch 95 is connected by wire 251 to the bolt for wiper "1." The bolt in station "2" of switch 95 is connected by wire 252 to bolt for wiper "2." The bolt in position "3" of switch 95 is connected by wire 253 to the bolt for wiper 6. The bolt in position "4" of switch 95 is connected by wire 254 to the bolt for wiper 7.

The tape may have four frames with correct answers 1, 2, 3 and 4, respectively. In the frame where the correct answer is "1," there are holes over wipers "4" and "1." In the frame with the correct answer "2," the holes are over wipers "4" and "2." In the frame with the correct answer of "3," the holes are over wipers "4" and "6." In the frame whose correct answer is "4," the holes are over wipers "4" and "7."

Let us consider that the operator sets switch 95 as shown in FIG. 8, and that a frame with the correct answer of "3" is in position to be read. If the operator depresses "AM I CORRECT?" Switch 94, then lamp 80 will be illuminated, the current passing from the battery, wire 240, lamp 80, wire 241, switch 94, wire 242, switch 117, switch 121, wire 245, wiper "4" (passing through hole "4") connector 52 (FIG. 9), wiper 6 (passing through hole 6), wire 253, switch arm 97 and wire 249 to the battery.

However, if the operator or player does not depress switch 94, but wants to be told the answer, he will swing the lever 130, now designated the "PLEASE TELL ME" switch, thereby breaking the connection between switches 117, 121. When foot 130c of switch 130 contacts bolt 132, a circuit is momentarily completed through answer lamp 62 to illuminate the answer printed on the frame so that the answer can be read through film 50. Now when the operator releases switch 130, it moves back to normal position due to the spring 133 which interconnects switches 126, 130, but the connection between switches 117, 121 remains broken and he can no longer get an illumination of lamp 80 by depressing switch 94.

However, he can reset the connection between switches 117, 121 by swinging switch 126 in a counter-clockwise direction, to cause lever 121 to swing in a clockwise direction (FIG. 8) into contact with switch 117. However, when switch 126 contacted bolt 128, the buzzer 110 is momentarily energized through the battery, wire 248, bolt 128, switch 126, bolt 124, wire 247, buzzer 110, wire 250, bolt 96 and wire 249 back to the other side of the battery. The buzzer is a note of negative reward or punishment for asking to have the correct answer illuminated.

In FIG. 18 there is illustrated a set-up utilizing the "THREE POINT SWITCH" 88, the "FIVE POINT SWITCH" 140, the "TEN POINT SWITCH" 95 (using only six positions thereof) and the "TWENTY POINT SWITCH" 102 (using only six positions thereof), in addition to utilization of the "AM I CORRECT?" switch 94.

This arrangement can be used for 540 answers, each consisting of four characters, one from each of the four switches. The three bolts 93, 92, 91 are designated in FIG. 18, as "a," "b" and "c," respectively. The bolts 143, 144, 145, 146, 147 of the FIVE POINT SWITCH 140 are designated in FIG. 18 by the characters "d," "e," "f," "g" and "h," respectively. In said FIG. 18, six bolts 98 (switch 95) are designated by characters "i," "j," "k," "l," "m" and "n," respectively. Bolts 105 of the TWENTY POINT SWITCH 102 are designated by characters "p," "q," "r," "s," "t" and "u" in FIG. 18.

The twenty wipers are designated by characters "a" to "n" and "p" to "u." The bolts for said wipers are connected by wires 260 to switch bolts "a" to "n" and "p" to "u" on the switches 88, 95, 102 and 140. Only one of said wires 260 is shown on the drawing, interconnecting wiper "d" with bolt "d" of switch 140.

The foil conductor 52 is replaced in the case, by a conductor or connector 262 shown in FIG. 18 as viewed from the top as well as viewed from the bottom. The conductor 262 comprises two areas 263 and 264 separated or insulated from one another by an insulation strip 265. Area 263 overlies wipers "a" to "h." Area 264 overlies wipers "i" to "n" and "p" to "u."

As shown in FIG. 18, one side of the batery is grounded. The other side of the battery is connected by wire 266 to bolt 89. Bolt 141 of switch 140 is connected by wire 267 to bolt 96 of switch 95. Bolt 103 of switch 102 is connected by wire 268 to bolt 94a. Bolt 94b is connected by wire 269 to one terminal of the "YOU ARE CORRECT" lamp 80. The other terminal of said lamp goes to ground.

In the set-up shown in FIG. 18, the correct answer is "c f k r." The holes on the frame with this correct answer will be (in reading position of the frame) over the wipers c, f, k and r. The current will go from the battery, through wire 266, switch arm 90, wire 260, which interconnects bolt c to the bolt for wiper c which passes through a hole in the tape, conductor area 263, wiper "f" which passes through a hole in the tape, wire 260 connecting wiper "f" with bolt "f" of switch 140, switch arm 142, wire 267, switch arm 97, wire 260 which connects bolt "k" of switch 95 with wiper "k" (which also passes through a hole in the tape), connector 264 to wiper "r" (which also passes through a hole in the tape), through wire 260 which connects wiper "r" with bolt "r" of switch 102, through switch arm 104 to wire 268, "AM I CORRECT?" switch 94, wire 269 and through lamp 80 to ground. Thus, if the switches 88, 140, 95 and 102 are correctly placed, and switch 94 is depressed, the lamp 80 will be illuminated to indicate that the player has come up with the correct answer.

Thus in this set-up, four holes are punched in each frame of the tape; and the path of electric current must make two trips to the tape wipers. The wiper connector must have a region of insulation between the first eight tape wipers (assigned to the first two switches 88 and 140) and the last twelve wipers (assigned to the last two switches 95, 102.

In FIG. 19, there is shown a set-up which allows the player to choose so that when he is correct either a lamp is lighted or a token reward comes out of the chute when the "AM I CORRECT?" switch 94 is depressed and the switch (in this case the "Twenty Point" switch 102) it correctly set by the player. The set-up of FIG. 19 may have nineteen answers to choose from.

One side of the battery is grounded. The other side of the battery is connected by wire 280 to bolt 94a. Bolt 94b is connected by wire 281 to bolt 103 of the "Twenty Point" switch 102. The twenty bolts of said switch arranged in a circle, are numbered "1" to "19" with one unnumbered. The wipers are numbers "1" to "19" with the last one unnumbered. Wipers "1" to "19" are connected by wires 282 to bolts designated "1" to "19," respectively, of switch 102. The unnumbered twentieth wiper is connected by wire 283 to bolt 141 of the "Five Point" switch 140. Only two bolts 143 and 147 of this switch are utilized. Bolt 143 is designated "CHUTE" and bolt 147 is designated "LIGHT." Bolt 143 is connected by wire 284 to bolt or terminal 190 of the electro-magnet 186. The other terminal 191 of said electro-magnet is grounded.

Bolt 147 is connected by wire 285 to one terminal of lamp 80. The other terminal of lamp 80 is grounded. The tape will have one hole over the twentieth unnumbered wiper, and one hole over one of the other wipers (1 to 19) for each frame. Said other hole will determine the correct answer.

FIG. 19, as illustrated is set for number 5 as the correct answer, and for lamp 80 to be illuminated upon depressing the switch 94. The hole in the frame of the tape in position for reading, is over wiper number "5." The current goes from the battery, wire 280, switch 94, wire 281, switch arm 104, bolt "5," wire 282 which connects bolt "5" with wiper "5," connector or conductor 52 (now shown in FIG. 19) which is engaged by wiper 5 because of a punched hole in the tape located over said wiper, unnumbered wiper (which also passes through a hole in the tape 22), wire 283, switch arm 142, "LIGHT" bolt 147, wire 285 and lamp 80 to ground.

If the switch 104 were not correctly placed, lamp 80 would not be energized.

If switch arm 142 is moved to engaged "CHUTE" bolt 143, the circuit to the lamp 80 would be broken and electro-magnet 186 energized to move latch 166 to transfer a steel ball from tube 153 to tube 176.

All the parts mounted on the board, such as bolts etc. are easy to apply or remove. The entire device may hence comprise a kit to be assembled easily. The parts, bolts, pieces of wire, lamps, switches, etc. may all come with the kit. It will be noted that many parts after assembly are at the back of the panel board 11 in compartment 17 and hidden by the back cover 16.

It will thus be seen that there is provided an article in which the several objects of this invention are achieved, and which is well adapted to meet the conditions of practical use.

As possible embodiments might be made of the above invention, and as various changes might be made in the embodiment above set forth, it is to be understood that all matter herein set forth, or shown in the accompanying drawings, is to be interpreted as illustrative and not in a limiting sense.

I claim:

1. In combination, a panel board having a front face and a rear face, a plurality of conductive wipers attached to the rear of the board and passing through the board to the front thereof, a sheet formed with one or more openings, means to support said sheet parallel to and at the front of the board, with said opening or openings aligned with one or more of said wipers, and a flat conductor overlying said sheet so that wipers aligned with said openings will pass through said openings and contact the underside of said conductor, a first rigid flat member underlying said sheet and having an opening exposing the portion of the sheet which overlies said wipers, and a second rigid flat member overlying said conductor and sheet, and having an opening overlying another portion of the sheet, said flat members and board having registering cut-outs covered by said sheet, and a translucent film covering said sheet at said registering cut-outs, and a lamp attached to said board at the rear thereof and in registry with said cut-outs.

2. The combination of claim 1, said sheet comprising an elongated tape, and manually controlled means to move said tape past said wipers.

3. The combination of claim 1, a multi-position switch on said board and comprising a switch arm movable into selective engagement with a plurality of terminals, and means for wiring one or more predetermined wipers to one or more predetermined terminals.

4. In combination, a panel board having a front face and a rear face, a plurality of conductive wipers attached to the rear of the board and passing through the board to the front thereof, a sheet formed with one or more openings, means to support said sheet parallel to and at the front of the board, with said opening or openings aligned with one or more of said wipers, and a flat conductor overlying said sheet so that wipers aligned with said openings will pass through said openings and contact the underside of said conductor, a multi-position switch on said board and comprising a switch arm movable into selective engagement with a plurality of terminals, and means for wiring one or more predetermined wipers to one or more predetermined terminals, a circuit for said wipers, wiring means, switch arm, and terminals, and including a lamp at the front of said board, a manual switch, and means to illuminate said lamp upon closing said manual switch when said switch arm is in predetermined position, depending upon the location of the opening or openings in said sheet.

5. The combination of claim 4, an electro-magnet on said board, means controlled by said electro-magnet to transfer an article from one position to another, and said circuit including said electro-magnet and manual switch means on said board to cause energization of said electro-magnet instead of said lamp, depending upon the position of said switch means.

6. The combination of claim 3, a circuit for said wipers, wiring means, switch arm and terminals, and said circuit including an electro-magnet mounted on said board, means controlled by said electro-magnet to transfer an article from one position to another, and said circuit including means to energize said electro-magnet when said switch arm is in a predetermined position.

7. The combination of claim 3, a circuit for said wipers, wiring means, switch arm and terminals, an electrically operated device on said board, and means in said circuit to energize said device when said switch arm is in a predetermined position.

8. In combination, a panel board having a front face and a rear face, a plurality of conductive wipers attached to the rear of the board and passing through the board to the front thereof, a sheet formed with one or more openings, means to support said sheet parallel to and at the front of the board, with said opening or openings aligned with one or more of said wipers, and a flat conductor overlying said sheet so that wipers aligned with said openings will pass through said openings and contact the underside of said conductor, a multi-position switch on said board and comprising a switch arm movable into selective engagement with a plurality of terminals, and means for wiring one or more predetermined wipers to one or more predetermined terminals, said conductor being divided into separate conductor areas by insulation so that said areas are insulated from one another.

9. The combination of claim 1, said panel being formed with a cut-out which said sheet overlies, and a lamp at the rear of said panel board and beneath said cut-out.

10. In combination, a panel board having a front face and a rear face, a plurality of conductive wipers attached to the rear of the board and passing through the board to the front thereof, a sheet formed with one or more openings, means to support said sheet parallel to and at the front of the board, with said opening or openings aligned with one or more of said wipers, and a flat conductor overlying said sheet so that wipers aligned with said openings will pass through said openings and contact the underside of said conductor, said panel being formed with a cut-out which said sheet overlies, and a lamp at the rear of said panel board and beneath said cut-out, a multi-position switch comprising a switch arm movable into selective engagement with a plurality of terminals, means wiring one or more predetermined wipers to one or more predetermined terminals, a circuit for said wipers, wiring means, switch arm, terminals and lamp, a second lamp in said circuit and mounted on the front of said panel board, manual switch means in said circuit, to cause said second lamp to be energized upon actuating said manual switch, a second manual switch in said circuit, and means controlled by one movement of said second manual switch to energize said first lamp and cut the second lamp out of the circuit.

11. The combination of claim 10, a buzzer on said board and in said circuit, and means controlled by another actuation of said second switch to reset said second lamp into the circuit and actuate said buzzer.

12. In combination, a board, means to mount a tape thereon for longitudinal movement, said tape being formed at one side thereof with openings, wipers attached to said board and adapted to selectively register with said openings, a flat conductor mounted on said board at said side of said sheet, and adapted to be engaged by wipers passing through aligned openings in the tape and a flat member overlying a transverse portion of said tape and said conductor, and having a window opening exposing an opposite side of the transverse portion of said tape, a lamp on said board, switch means controlling said lamp, and comprising a single switch member, a contact engaged thereby, a pair of switch members on opposite sides of said first switch member and normally spaced therefrom, spring means interconnecting said pair of members to move said pair of members in opposite directions, stop means on said board to limit movement of said pair of members in opposite directions, one of said pair of members having means to move said single switch member to disengage it from said contact, upon moving said one of said pair of members, and the other of said members, upon being moved, having means to move said single member back into engagement with said contact.

13. The combination of claim 12, a multi-point switch mounted on said board and comprising a manual rotary switch arm and a plurality of terminals adapted to be selectively engaged by said switch arm, and means wiring selected wipers to selected terminals.

14. The combination of claim 13, a lamp on said board, a switch on said board, and means wiring said switch to said lamp and to said first mentioned wiring.

15. The combination of claim 12, said means to move said tape comprising a pair of parallel rollers rotatably mounted on said board and on which ends of the tape are rolled.

16. The combination of claim 12, and a plurality of multi-point manual switches on said board, each comprising a rotary switch arm and a plurality of terminals adapted to be electrically engaged by said arm, an electrically operated device on said board, and means controlled by positioning of said arms to cause said electrically operated device to become energized.

17. In combination, a board, a plurality of wipers, means to attach said wipers to said board, a sheet, means to mount said sheet on said board, said sheet having one or more openings aligned with one or more of said wipers, a flat surface conductor over said sheet adapted to be contacted by wipers aligned with and passing through said openings, a multiple point switch comprising a switch arm, means to rotatably mount said switch arm on said board, and contacts mounted on said board and adapted to be selectively contacted by said switch arm, a circuit including conductive means to connect one or more wipers with one or more of said contacts, respectively, an electrically actuated device, means to mount said device on said board, and means to connect said electrically actuated device and switch arm in said circuit, said circuit including a first switch member, a second switch member movably mounted on said board and in one position thereof engaging the first switch member, a third switch member movably mounted on said board and having means to move said second switch member out of engagement with respect to said first switch member, upon manually moving said third member away from normal, resilient means to move said third member back to normal upon releasing said third member, a fourth member movably mounted on said board and being manually movable away from its normal condition to move said second switch member back into engagement with said first switch member, and said resilient means comprising means to return said fourth switch member to normal upon releasing said fourth switch member.

18. The combination of claim 17, a pair of electrical devices and means controlled by movement of said third and fourth switch members to momentarily selectively energize said pair of electrical devices, respectively, upon moving said third and fourth switches, respectively, away from normal.

19. The combination of claim 17, said means for attaching said wipers, said sheet, switch arm and electrically actuated device to said board comprising bolts passing through said board, and including nuts screwed to the shanks of the bolts and said bolts serving as binding posts for wiring attached thereto, and said contacts of said multiple point switch comprising bolts passing through said board, and serving as binding posts for wiring attached thereto.

20. In combination, a panel board having a front face and a rear face, a plurality of conductive wipers attached to the rear of the board and passing through the board to the front thereof, a sheet formed with one or more openings, means to support said sheet parallel to and at the front of the board, with said opening or openings aligned with one or more of said wipers, and a flat conductor overlying said sheet so that wipers aligned with said openings will pass through said openings and contact the underside of said conductor, a multi-position switch on said board and comprising a switch arm movable into selective engagement with a plurality of terminals, and means for wiring one or more predetermined wipers to one or more predetermined terminals, wherein said conductor comprises a flat sheet made up of a plurality of electrically conducting areas, and means for insulating said areas one from another.

21. The combination of claim 20, means to move said tape in a longitudinal direction, said positions being arranged in a plurality of rows with a plurality of positions in each row, said rows extending in said longitudinal direction of movement of said tape.

22. The combination of claim 21, said means including means to reverse the direction of flow of current through said electrically operated device upon moving said tape to cause each of said openings to move into registry with a plurality of said wipers.

References Cited by the Examiner

UNITED STATES PATENTS

| | | | |
|---|---|---|---|
| 2,528,828 | 11/1950 | Henry | 35—48 |
| 2,911,741 | 11/1959 | Boyer | 35—9 |
| 3,082,545 | 3/1963 | Kiker | 35—9 |
| 3,089,255 | 5/1963 | Thompson | 35—9 |
| 3,096,592 | 7/1963 | Schuster | 35—9 |
| 3,123,920 | 3/1964 | Crowder et al. | 35—9 |
| 3,172,216 | 3/1965 | Mueller | 35—48 |

EUGENE R. CAPOZIO, *Primary Examiner.*

R. W. WEIG, *Assistant Examiner.*